United States Patent [19]
Rhodes

[11] Patent Number: 6,164,048
[45] Date of Patent: Dec. 26, 2000

[54] QUICK RELEASE APPARATUS

[76] Inventor: David Meritt Rhodes, P.O. Box 6204, Venice, Fla. 34292

[21] Appl. No.: 09/167,664

[22] Filed: Oct. 7, 1998

[51] Int. Cl.⁷ .................. B68B 1/00; B68B 1/14
[52] U.S. Cl. ..................... 54/1; 54/23; 24/115 F
[58] Field of Search .................. 54/1, 23, 69; 24/115 F; 119/772, 792, 805, 865

[56] References Cited

U.S. PATENT DOCUMENTS

| | | |
|---|---|---|
| 281,860 | 7/1883 | Jones . |
| 438,360 | 10/1890 | Phelps . |
| 444,387 | 1/1891 | Harris . |
| 577,315 | 2/1897 | Nichols . |
| 934,449 | 9/1909 | Leech et al. . |
| 957,517 | 5/1910 | Pasley . |
| 962,890 | 6/1910 | Byrd et al. . |
| 1,130,049 | 3/1915 | Welches . |
| 1,190,383 | 7/1916 | Court . |
| 1,610,679 | 12/1926 | Hoadley . |
| 2,821,003 | 1/1958 | Boyes et al. . |
| 3,139,863 | 7/1964 | Steinbach . |
| 3,288,112 | 11/1966 | Welton . |
| 3,805,336 | 4/1974 | Jungersen et al. . |
| 3,848,571 | 11/1974 | Pearson et al. . |
| 3,934,848 | 1/1976 | Snyder .................. 244/151 A |
| 4,267,685 | 5/1981 | Cragin ........................ 54/1 |
| 4,533,276 | 8/1985 | Stidham . |
| 4,742,605 | 5/1988 | Ritacco . |
| 4,777,784 | 10/1988 | Ferguson .................... 54/34 |
| 4,820,094 | 4/1989 | Hirakui et al. . |
| 4,903,638 | 2/1990 | Lacey . |
| 4,909,658 | 3/1990 | Townsend . |
| 5,092,276 | 3/1992 | Rockhold ................. 54/71 X |
| 5,103,771 | 4/1992 | Lee . |
| 5,195,217 | 3/1993 | Arntzen ................. 24/115 F |
| 5,197,410 | 3/1993 | Wilson et al. . |
| 5,423,164 | 6/1995 | Schneider ................. 54/44.1 |
| 5,785,011 | 7/1998 | Gitterman, III ............. 119/865 |

*Primary Examiner*—Robert P. Swiatek
*Attorney, Agent, or Firm*—Burns, Doane, Swecker & Mathis, L.L.P.

[57] ABSTRACT

An animal restraint or handling device incorporates a quick-release mechanism that is essentially free of any biasing member, pivoting member, or camming action member. Particular embodiments include a rodeo rider's rope, animal hobble and cross-tie each incorporating a quick-release mechanism constructed generally as a three ring type release.

11 Claims, 17 Drawing Sheets

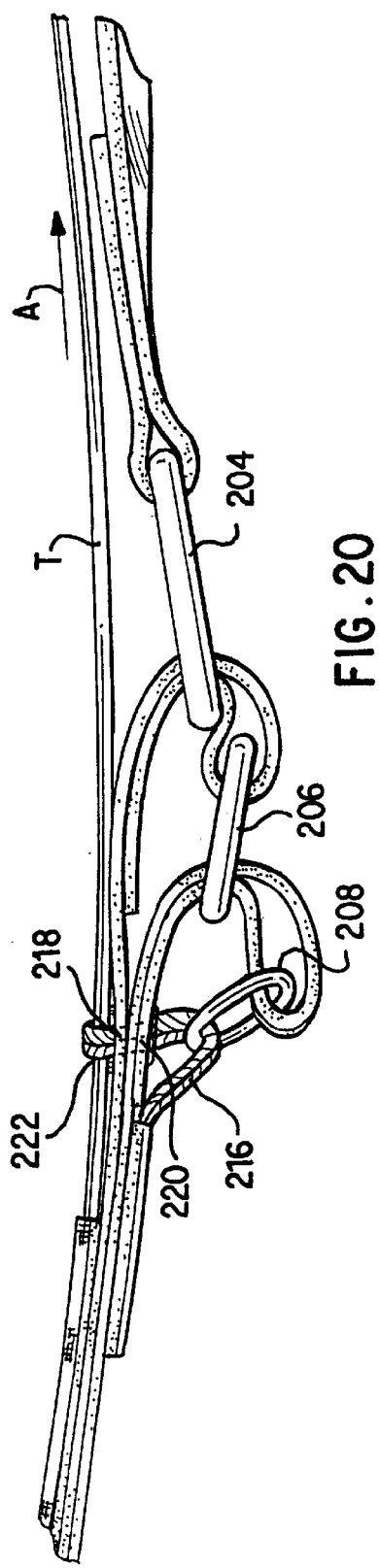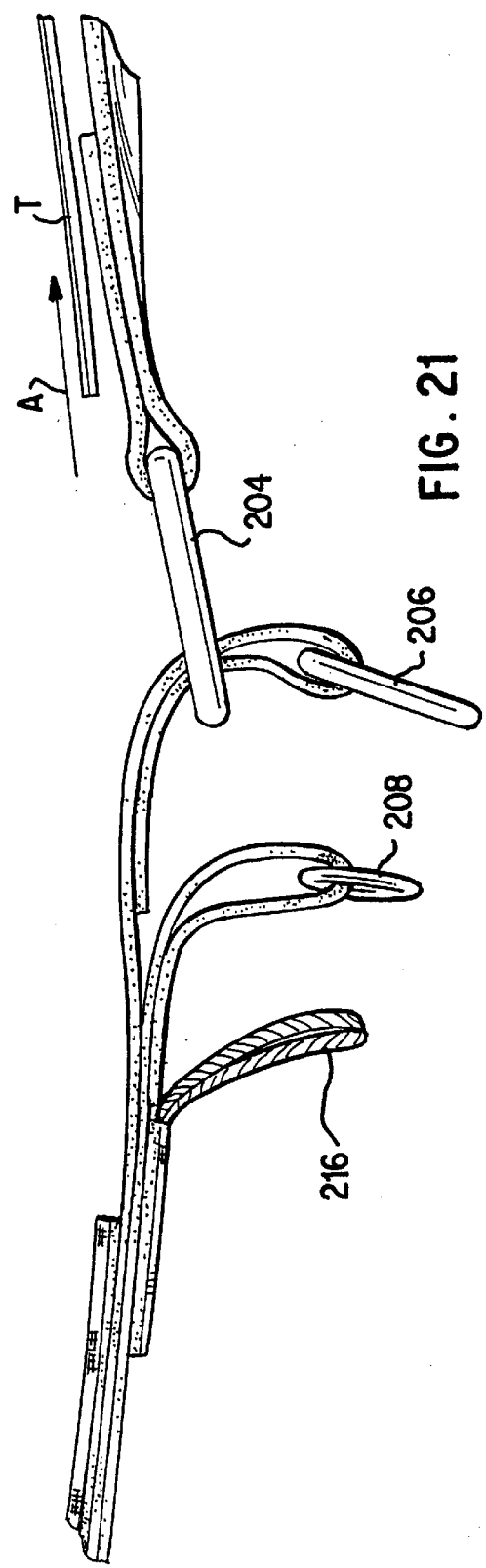

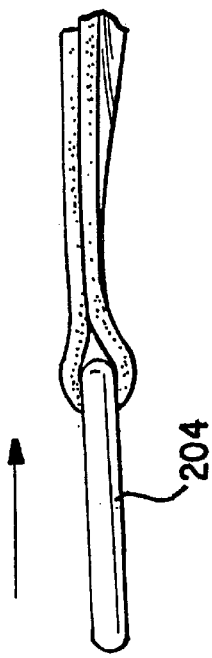
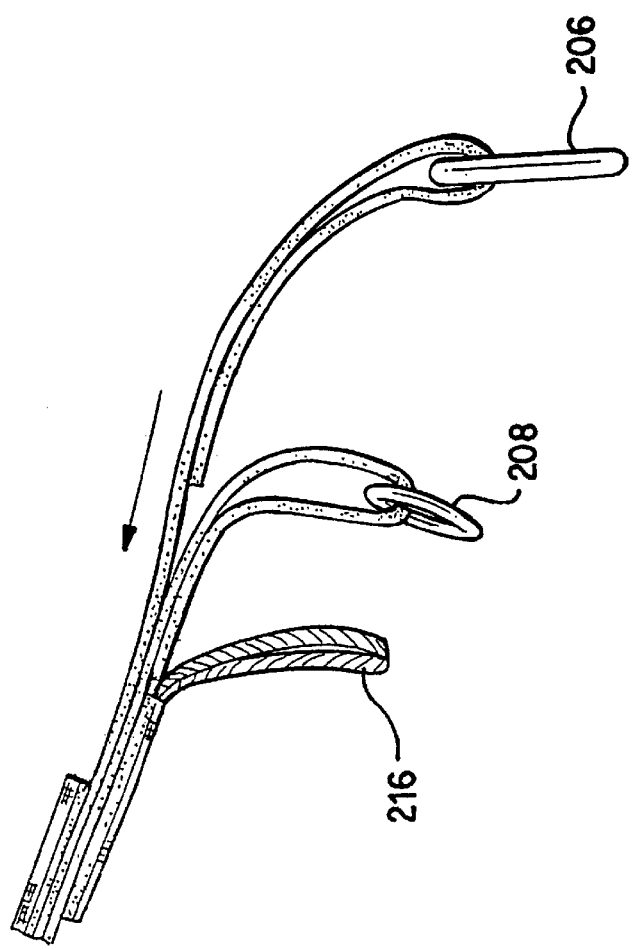
Fig. 22

QUICK RELEASE APPARATUS

BACKGROUND OF THE INVENTION

1.) Field of the Invention

The invention relates to quick release devices generally. In particular, the invention relates to a quick release rodeo rider's rope, animal hobble, and cross tie.

2.) Related Art

It is known to incorporate various quick-release mechanisms into devices used to restrain or handle animals. Quick release mechanisms currently in use include biased latch-type mechanisms which can easily become corroded or contaminated by moisture, dirt, and debris, thereby making their operation unreliable.

One type of release which does not include a biasing member, pivoting member, or camming action member is a "three-ring" type release which is of a type used in the parachute art. However, to the best of Applicant's knowledge, an animal restraint or handling device effectively able to incorporate such a release has yet to be developed.

Specific restraints or handling devices which could benefit from a more reliable quick release mechanism include rodeo rider ropes, animal hobbles, and cross-ties. Other known restraints and handling devices could be developed to incorporate a three-ring type release consistent with the present application.

U.S. Pat. No. 4,909,658 to Townsend discloses a bull rope incorporating a quick-release mechanism, the disclosure of which is incorporated herein by reference. The quick-release disclosed therein includes a spring biased latch arm and a main pivoting latch arm. As noted above this type of mechanical arrangement is prone to contamination and corrosion, and the mechanical moving parts often fail to function properly. Also, the only means disclosed of actuating the release mechanism is by manually pulling the release cord.

U.S. Pat. No. 4,267,685 to Cragin discloses a bullrope having a free end releasably fastened to form a loop which can be more easily grasped to free the rider's hand from the rope. Cragin does not disclose connecting a first and second end of the rope via a quick-release mechanism.

U.S. Pat. No. 962,890 to Byrd et al. discloses a harness for controlling animals. A release mechanism is provided for the "operable ropes" of the restraint. The release is located along the lower side area of the animal, which is relatively difficult to access when the animal is standing. The release is activated by pressing a thumb piece, which requires the handler to position himself close to the animal in order to activate the release mechanism, thereby increasing the danger the handler will be kicked or otherwise harmed by the animal. Also, the release utilizes spring-biased mechanical parts which are susceptible to contamination, corrosion, and subsequent failure as noted above.

U.S. Pat. No. 1,610,679 to Hoardley discloses a kick-preventing device for animals that incorporates a pivoting release lever. The release lever is located at the hind quarters of the animal. This location is disadvantageous because the handler must be located near the hind legs of the animal in order to activate the release, thereby increasing the possibility of being kicked by the animal. In addition, pivotable lever is susceptible to contamination, corrosion, and subsequent failure.

U.S. Pat. No. 3,848,571 Pearson et al. discloses a "hobble" for controlling the gait of pacing horses. The hobble includes a plastic adjustment buckle which is actuated by a handle member that projects slightly out of the buckle housing. Therefore, the handler must reach down near the legs of the animal to actuate the buckle, thereby presenting a risk of being kicked by the animal. Also, the buckle includes relatively moveable pivoting and camming members that can be adversely affected by contamination of debris.

U.S. Pat. No. 5,197,410 to Wilson et al. discloses a releasable tether having a hook-shaped end and a spring-biased bolt closing member. The release mechanism includes a cable housed in a plastic tube. One end of the cable is connected to the bolt, the other end is connected to a trigger member. This release mechanism is rather complex, and includes moveable spring-biased parts which are prone to contamination, corrosion, and subsequent failure.

U.S. Pat. No. 4,742,605 to Ritacco discloses a safety release device which is automatically actuated and releases the animal when a certain pulling force on the release is exceeded. Therefore, the handler is not able to control or accurately predict when the animal will be released. Under most circumstances, it is preferable for the handler to control when the animal will be released. Also, the release disclosed in Ritacco includes spring-biased moveable parts that are prone to contamination and corrosion as noted above.

U.S. Pat. No. 5,103,771 to Lee discloses a remotely controlled quick-release device. The release can be actuated by electro-mechanical means or manually by purely mechanical means. The release disclosed in Lee is overly complicated, and includes spring-biased relatively moveable parts that are subject to corrosion and contamination as noted above.

OBJECTS AND SUMMARY

It is an object of the present invention to provide improved quick-release animal restraints and handling devices that are simple, reliable, and inexpensive.

It is a further object of the present invention to provide a quick release animal restraint or handling device that can be safely actuated with a reduced risk of being kicked or otherwise injured by the animal during actuation of the release mechanism.

These and other objects are attained by providing an animal restraint or handling device with a quick-release mechanism that is essentially free of any biasing member, pivoting member, or camming-action member.

Specific embodiments of the present invention includes a rodeo rider's rope, and an associated method of its release, a hobble, and a cross tie.

A rodeo rider's rope constructed according to the principles of the present invention includes first and second end rope portions connected in a releasable manner by a quick-release mechanism that is essentially free of any biasing member, pivoting member, or camming action member.

A method of releasing a rodeo rider's rope according to the present invention includes slidably attaching a trigger member to a rope and attaching an end of the trigger to the rider such that when the rider is thrown or otherwise dismounts from the animal, the trigger is slid relative to the rope, the quick release mechanism is activated and the connection between the first and second ends is broken.

An animal hobble constructed according to the present invention includes a body attachment portion, at least one leg restraint attached to the body attachment portion, a plurality of leg cuffs attached to the at least one leg restraint having first and second end cuff portions that are releaseably connected by a quick-release mechanism, each quick-release mechanism includes a trigger member of sufficient length to extend from the quick release mechanism to the body attachment portion, thereby permitting actuation of the quick-release mechanism from a location proximate the head of the animal and at a relatively safe distance from the animal's legs.

A cross-tie constructed according to the present invention includes first and second end cross-tie portions connected by a quick-release mechanism that is essentially free of any biasing member, pivoting member, or camming-action member.

A plurality of cross-ties constructed according to the present invention each include a quick release mechanism and an associated trigger mechanism which is slidably connected to a respective cross-tie. The plurality of trigger mechanism are connected to each other and form a singular grasping portion, thereby permitting activation of the plurality of quick-release mechanisms of the plurality of cross-ties via the singular grasping portion.

BRIEF DESCRIPTION OF THE DRAWING FIGURES

FIG. 20 is a partial side view of the quick-release mechanism of the cross-tie of FIGS. 15 and 16 shown just prior to activation.

FIG. 21 is a partial side view of the quick-release mechanism of FIGS. 15 and 16 shown in a partially activated condition.

FIG. 22 is a partial side view of the quick-release mechanism of FIGS. 15 and 16 shown in a fully activated condition.

DETAILED DESCRIPTION OF THE PREFERRED EMBODIMENTS

FIGS. 1–7 illustrate a first embodiment of the present invention. In this embodiment a rodeo rider's rope is constructed to incorporate a quick-release mechanism constructed according to the principles of the present invention.

Figure 1:
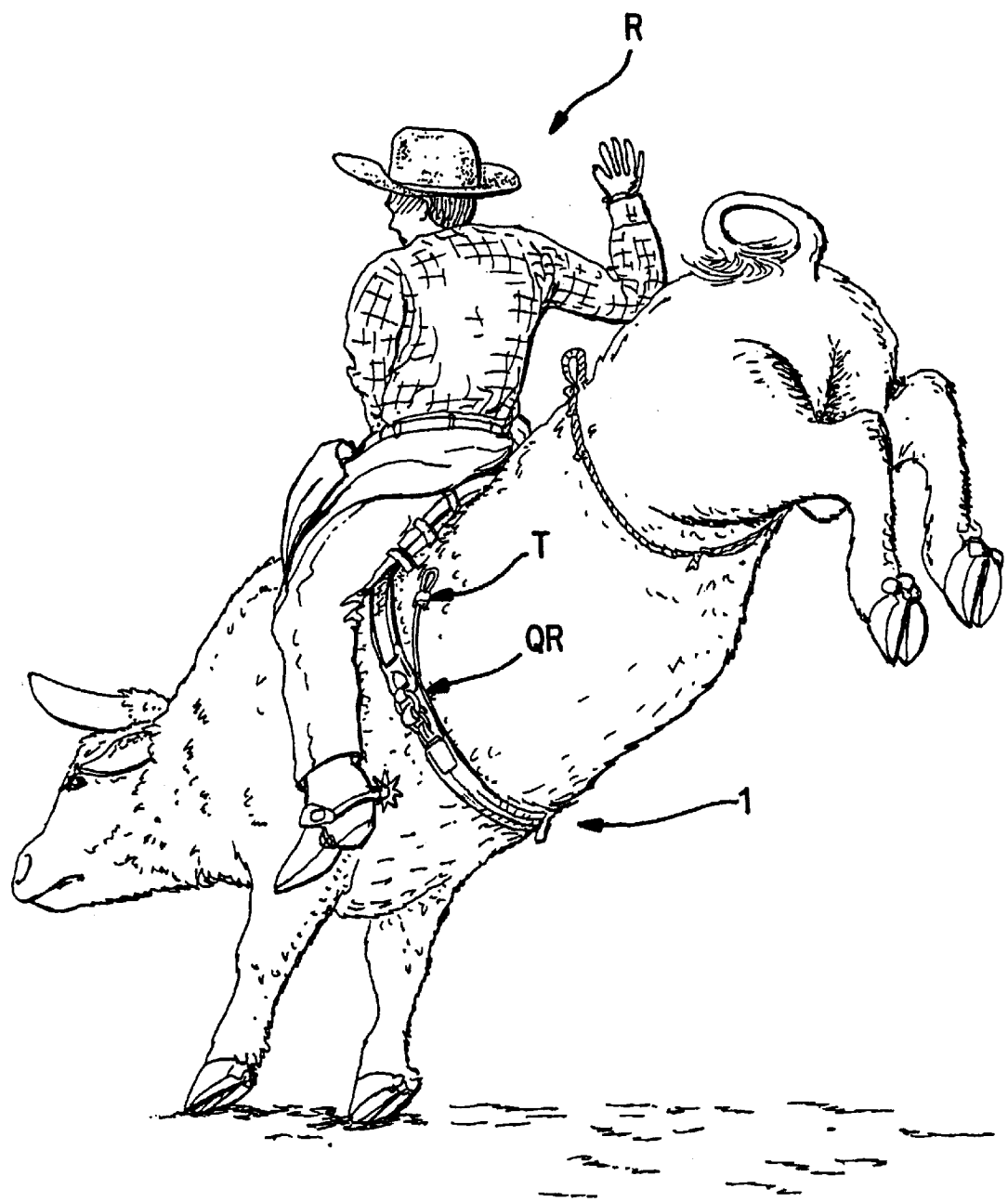
FIG. 1 is an illustration of a rodeo rider's rope incorporating a quick-release mechanism constructed according to the principals of the present invention.
Figure 2:
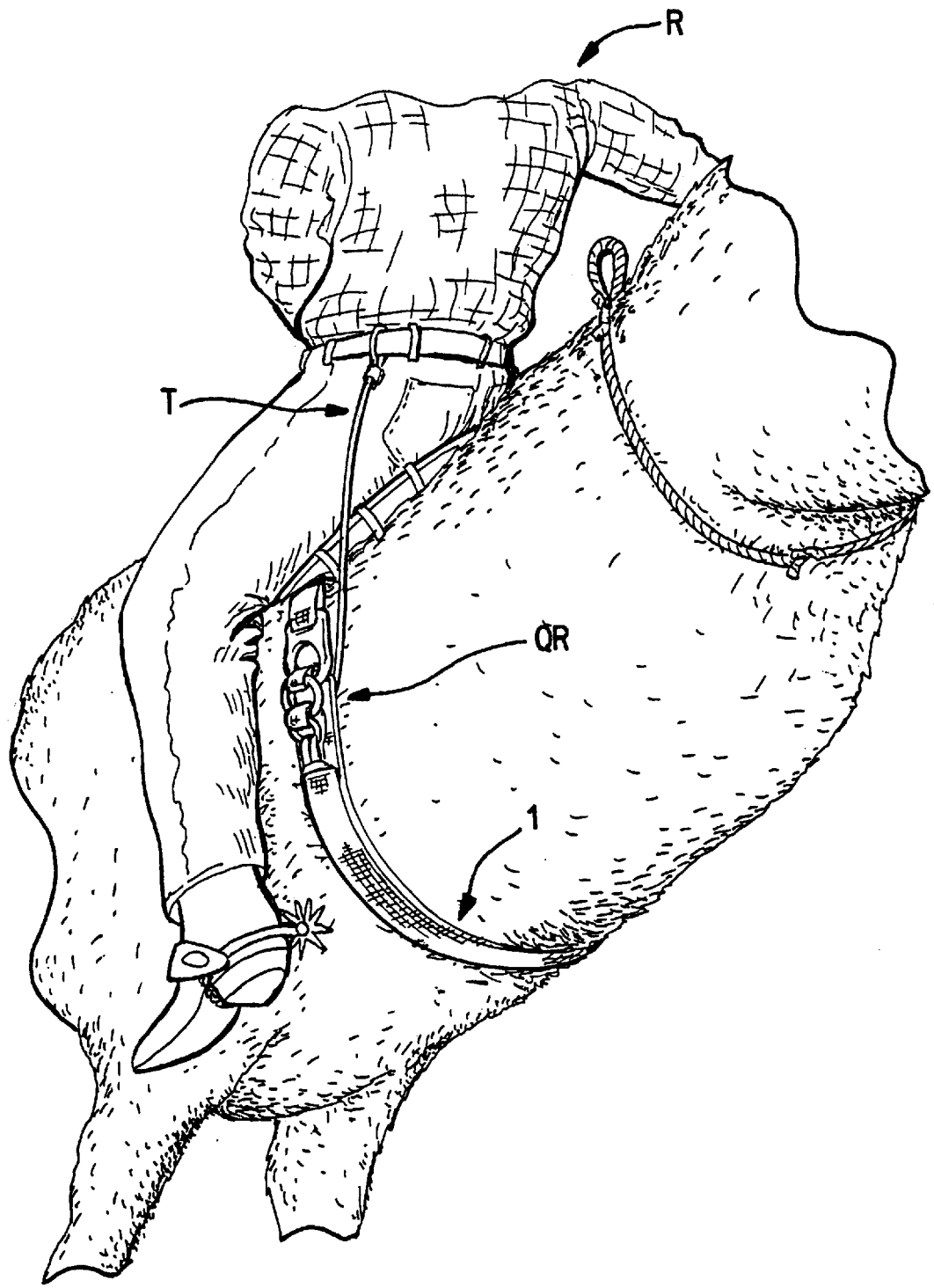
FIG. 2 is an alternative embodiment of the rodeo rider's rope of FIG. 1.

As illustrated in FIGS. 1 and 2, the rope 1 is wrapped around the body of an animal and the rider's hand is held tightly between the rope 1 and the body of the animal. Oftentimes it is difficult for the rider to free his hand from the rope 1 upon being thrown or otherwise dismounting from the animal. This poses a dangerous situation to the rider and other rodeo personnel, such as rodeo clowns, who must attempt to free the rider's hand. Therefore it is advantageous to incorporate a quick-release mechanism QR into the rope 1, thereby facilitating removal of the rider's hand from the rope 1. The quick-release mechanism QR incorporates a trigger member T which is relatively easily grasped to actuate the quick-release mechanism QR.

In the embodiment of FIG. 1 the trigger member T can be manually grasped to activate the quick-release mechanism QR by either the rider or rodeo clown. In a modification of this embodiment shown in FIG. 2, the trigger member T can be attached to the rider R such that when the rider R is thrown or otherwise dismounts from the animal, the quick-release mechanism is automatically activated in the rider's hand is freed from the rope 1. The quick-release mechanism of this embodiment will now be described in more detail by reference to FIGS. 3–7.

Figure 3:
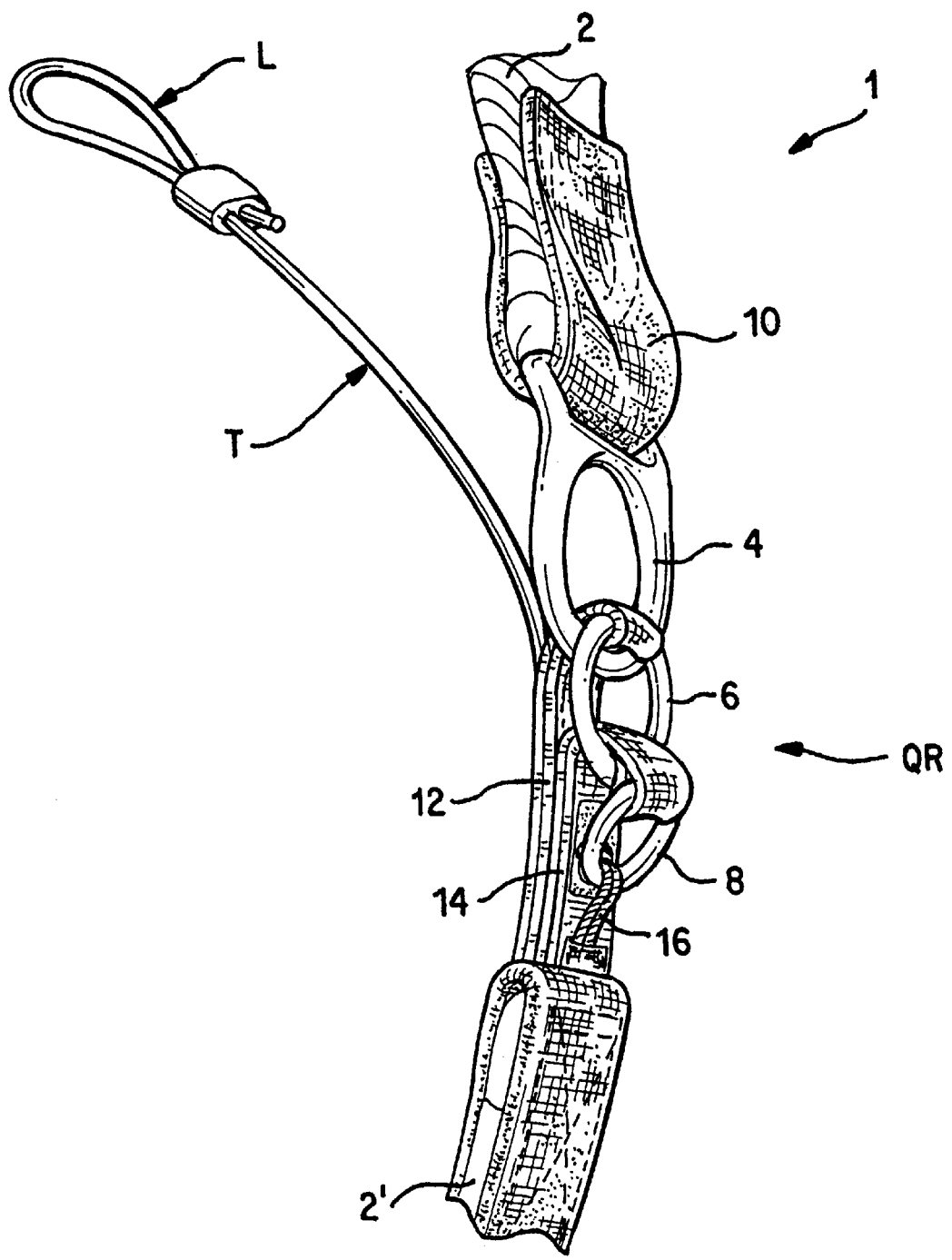
FIG. 3 is a partial outer perspective view of the quick-release mechanism of FIGS. 1 and 2.
Figure 4:
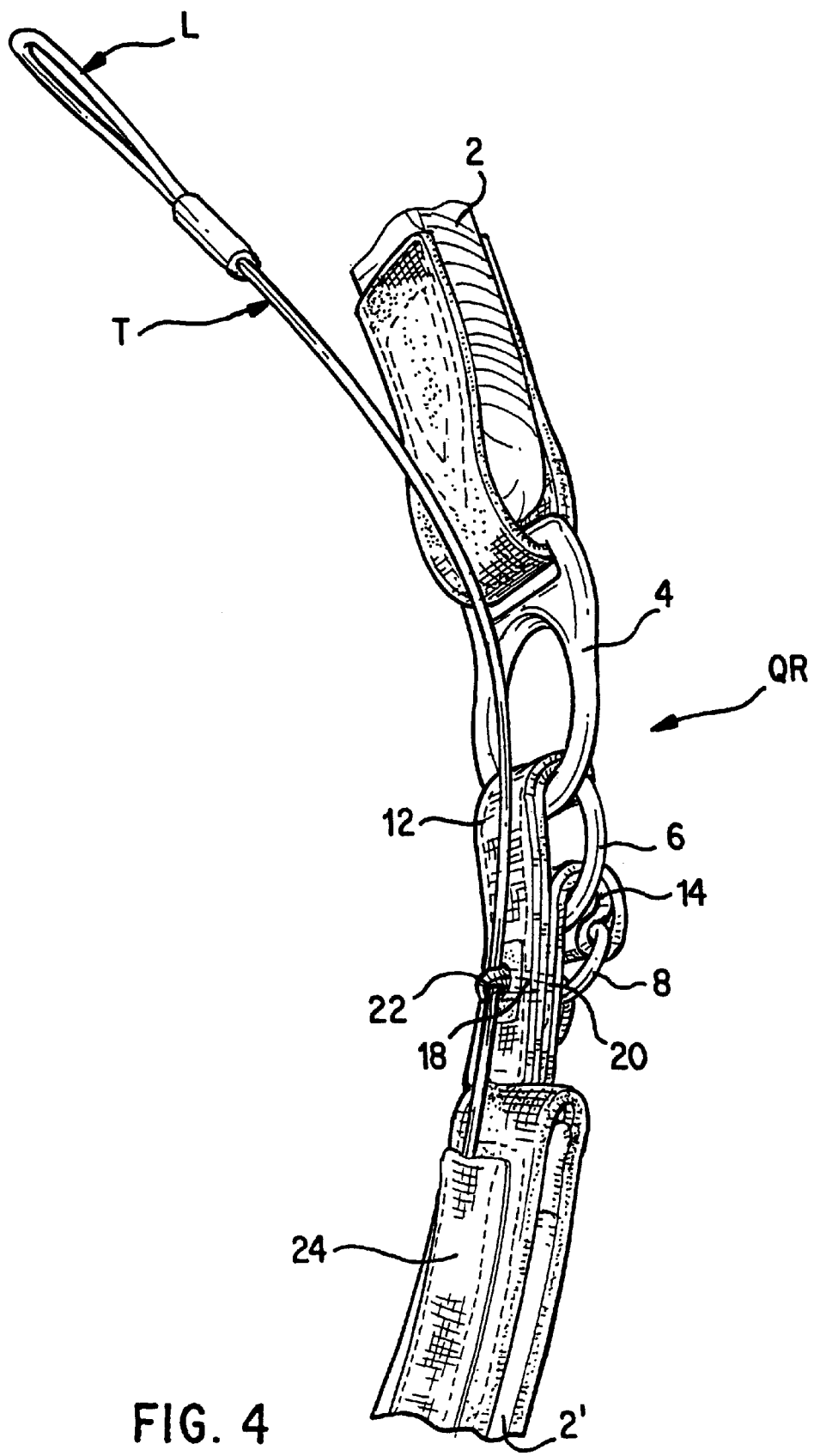
FIG. 4 is a partial inner perspective view of the quick-release mechanism of FIGS. 1 and 2.

As best illustrated in FIGS. 3–4, the rope 1, which may be constructed in any suitable fashion from any acceptable material, has a first and second end rope portion 2 and 2' which are connected in a releasable manner by the quick-release mechanism QR. The first and second end rope portions 2 and 2' may be looped or have loop shaped members attached thereto. The quick-release mechanism QR includes a first large ring 4 attached to the first end rope portion 2 by a first connector 10. A second mid-size ring 6 is attached to the second end rope portion 2' by a second connector 12. And a third small ring 8 is connected to the second end rope portion 2' by a third connector 14. A release member 16 is also attached to the second end rope portion 2'.

The first large ring 4 and the second mid-size ring 6 are sized relative to each other such that the second mid-size ring 6 can pass freely through the opening in the first large ring 4. The second mid-size ring 6 and the third small ring 8 are sized relative to each other such that the third small ring 8 can pass freely through the opening in the second mid-size ring 6.

In a connected state, the second connector 12 is looped through the first large ring 4. The third connector 14 is looped through the second mid-size ring 6 and the release member 16 has a free end which is looped through the third small ring 8 and passes through an opening 18 in the second connector and an opening 20 in the third connector 14.

The trigger member T passes through an opening 22 in the free end of the release member 16 and is slidably attached to the rope 1 in any suitable manner. By way of example, a pocket 24 may be provided either within the rope member itself or attached to an outer surface thereof, to slidably receive the trigger T. As illustrated, for example, in FIGS. 3 and 4 the trigger member T is provided with an end portion suitable for grasping. This end may take any suitable form, such as a loop L as shown in FIGS. 3 and 4.

Figure 5:
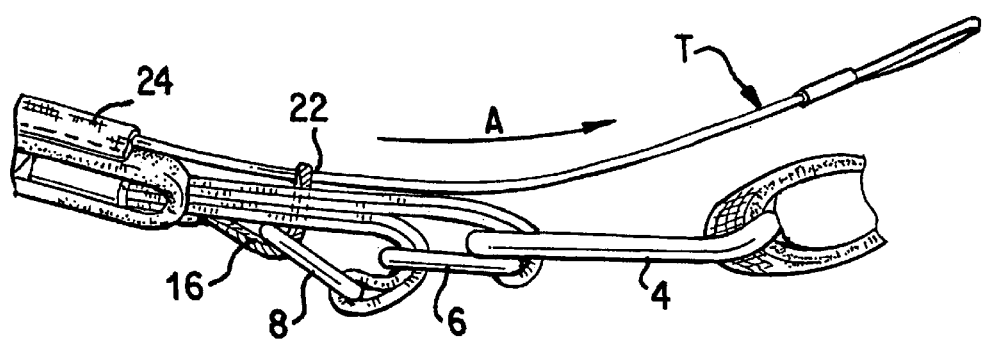
FIG. 5 is a side view of the quick-release mechanism of FIGS. 1 and 2 shown just prior to activation.
Figure 6:
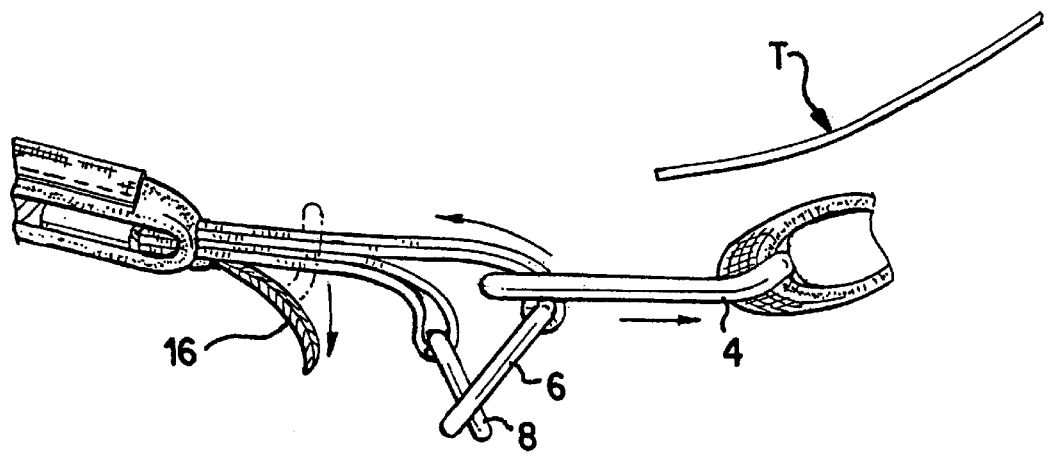
FIG. 6 is a side view of the quick-release mechanism of FIGS. 1 and 2 shown in a partially activated condition.
Figure 7:
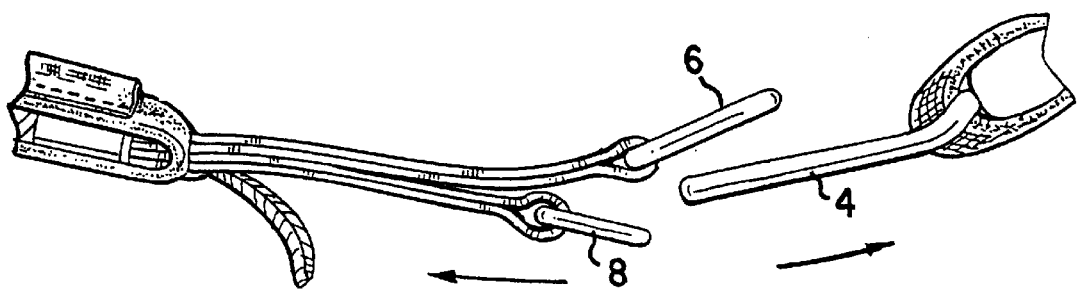
FIG. 7 is a side view of the quick-release mechanism of FIGS. 1 and 2 shown in a fully actuated condition.

Activation of the quick-release mechanism QR will now be more fully described by reference to FIGS. 5–7.

Trigger member T is pulled in the direction of arrow A and slides out of pocket 24 and through the opening 22 in the free end of the release member 16. As illustrated in FIG. 6, once the trigger member T has been fully removed from the pocket 24 and is completely withdrawn through the opening 22 in the release member 16, the release member 16 is pulled through opening 18 in the second connector 12, and through the opening 20 and the third connector 14, by tension applied to the first and second end rope portions 2 and 2'. The third small ring 8 is now freed and passes through the opening in the second mid-size ring 6. Once the small ring 8 has been pulled through the opening in the second mid-size ring 6, the second mid-size ring 6 is now freed and is pulled through the opening in the first large ring 4. Once the second mid-size ring 6 has been pulled through the opening in the first large ring 4, the quick-release QR is fully activated and the releasable connection previously formed between the first and second end rope portions 2 and 2' is now broken. As previously noted, the quick-release mechanism QR is constructed without the use of any bias member, pivoting member, or camming action member, thereby providing increased resistance to corrosion and contamination which can adversely affect the reliability and operation of the quick-release.

Trigger member T can be of any suitable construction. For example, trigger member T can be constructed of a hollow plastic tube.

A second embodiment of the present invention will now be described by reference to drawing FIGS. 8–14.

Figure 8:
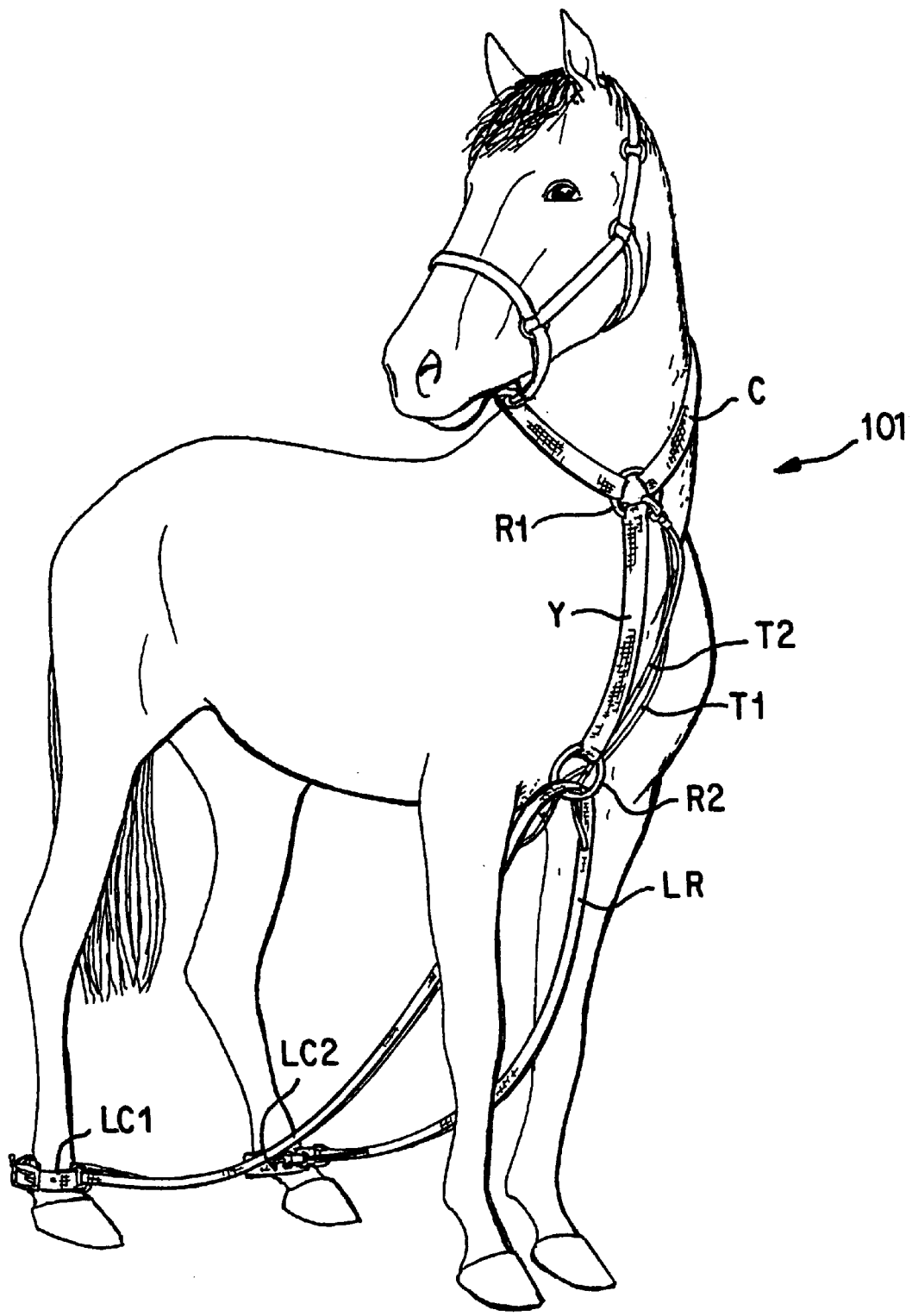
FIG. 8 is an illustration of a hobble constructed according to the principles of the present invention attached to an animal.
Figure 9:
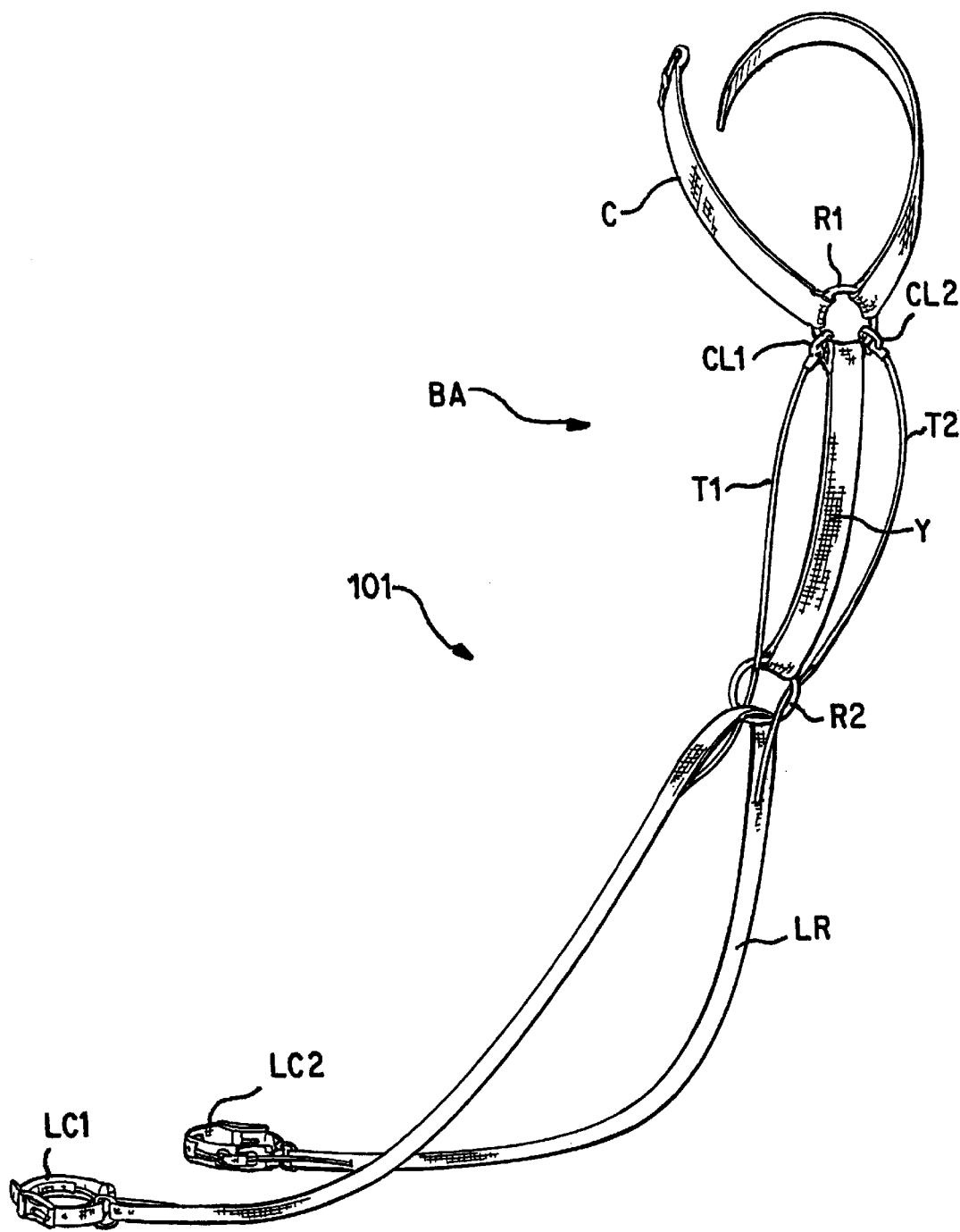
FIG. 9 is an illustration of a hobble constructed according to the present invention.

In this embodiment an animal hobble 101 is constructed according to the principles of the present invention. As illustrated in FIGS. 8 and 9 the hobble 101 includes a body attachment portion BA of any suitable construction. For example, the body attachment portion BA can include a collar C and a yoke Y connected by a first attachment ring R1. At least one leg restraint member LR is attached to the yoke Y by a second connecting ring member R2. A plurality of leg cuffs LC1 and LC2 are connected to the at least one leg restraint member LR.

Figure 10:
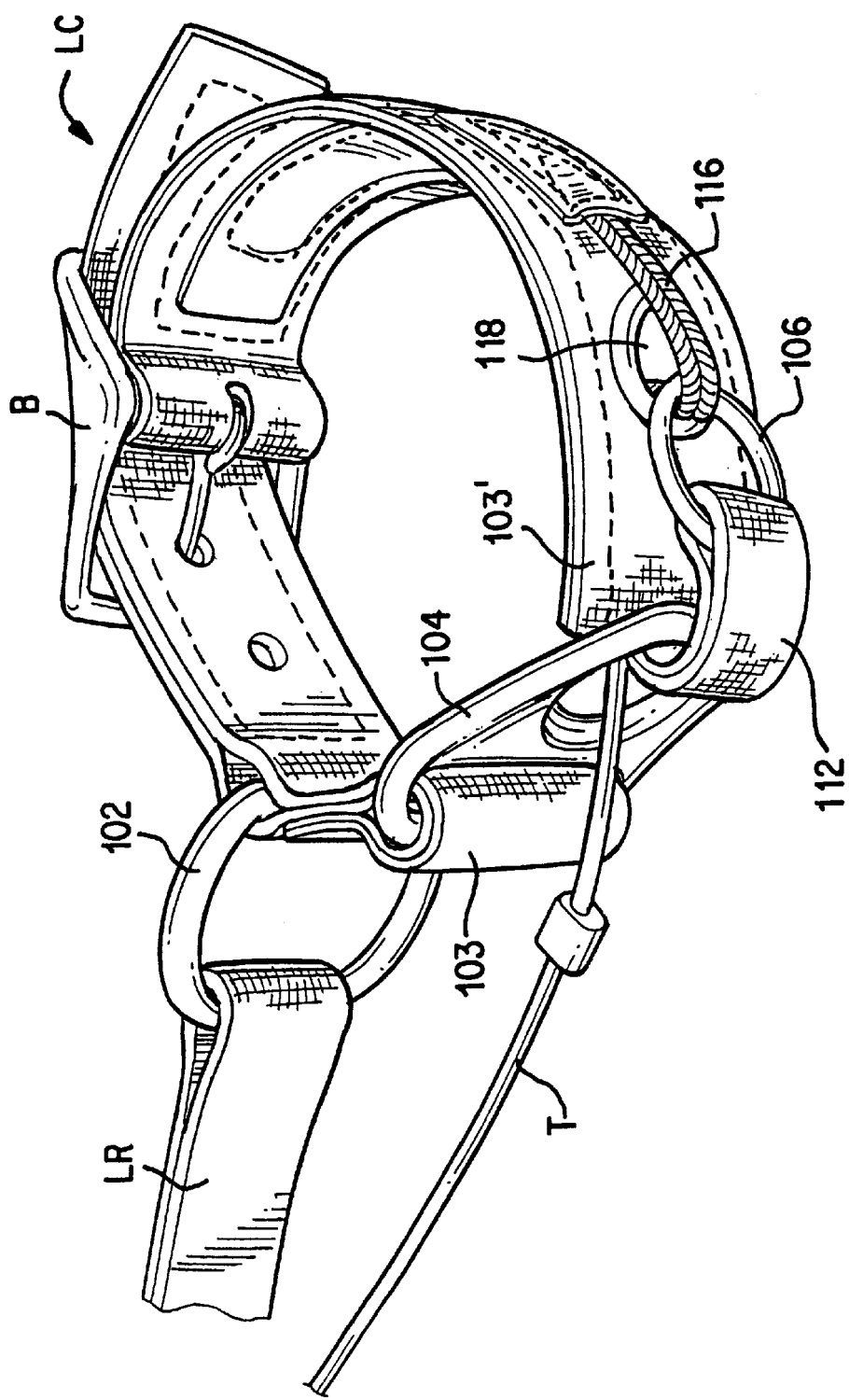
FIG. 10 is a perspective view of a leg cuff of the hobble of FIG. 9.
Figure 11:
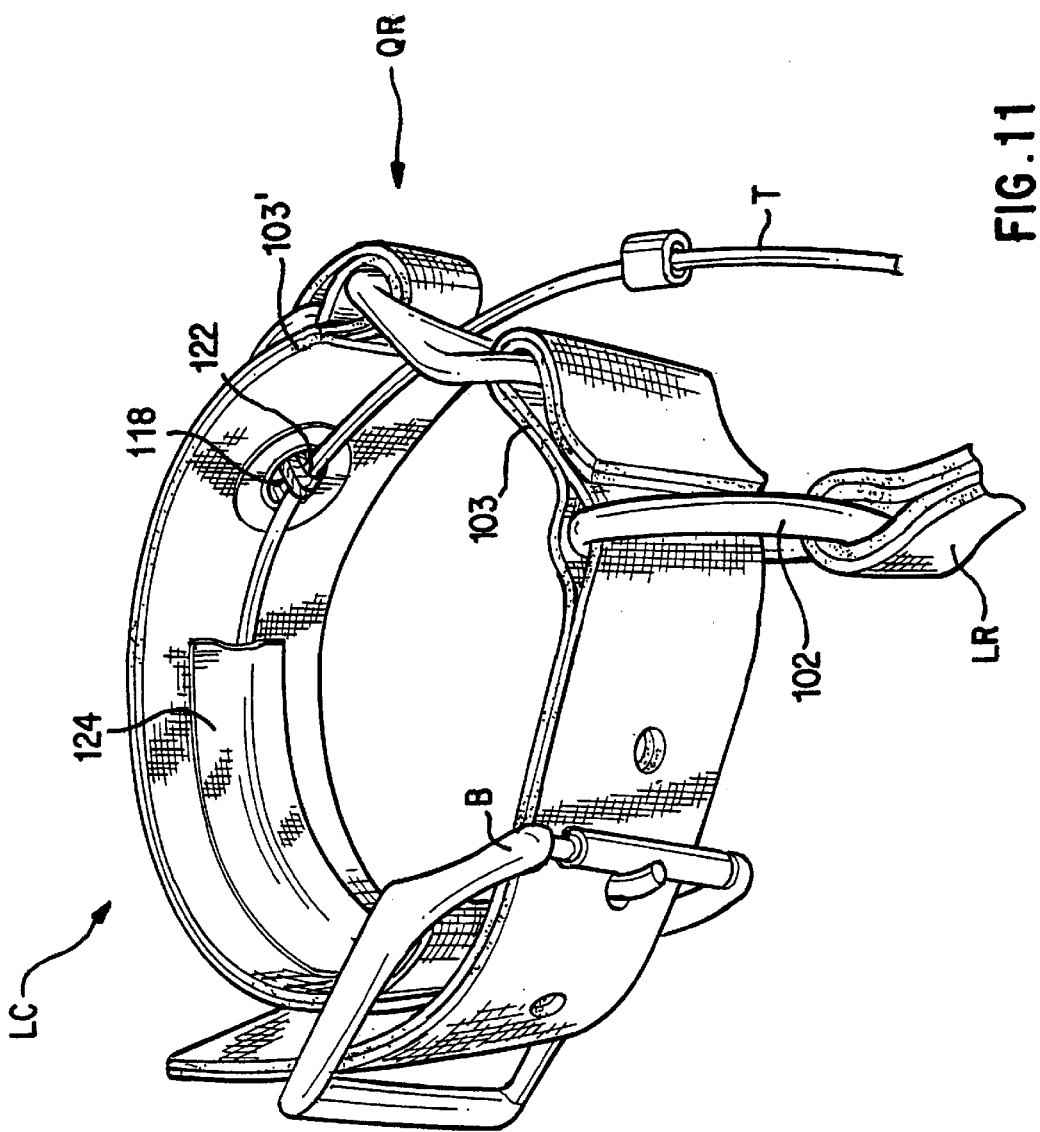
FIG. 11 is a perspective view of a leg cuff of the hobble of FIG. 9.

The details of a leg cuff LC constructed in accordance with the principles of the present invention is illustrated in more detail in FIGS. 10 and 11. Each leg cuff member LC is attached to the at least one leg restraint member LR by connecting ring member 102. Leg cuff LC includes a first end cuff portion 103 and a second end cuff portion 103'. The first and second end cuff portions 103, 103' may have looped end portions or may have a looped member attached thereto. The quick-release mechanism QR includes first large ring 104 connected to the first end cuff portion 103. A second relatively small ring 106 is connected to the second end cuff portion 103' by a second connector 112. A release member 116 is attached at one end thereof to the leg cuff LC in any suitable manner. In the connected state, the second connector 112 loops through the opening in the first large ring 104. A free end of the release member 16 loops through opening in the second relatively small ring 106 and passes through an opening 118 in the leg cuff LC. As best illustrated in FIG. 11, the trigger member T passes through an opening 122 in a free end of the release member 116.

The trigger member T, which can be constructed in a manner similar to that described in connection with the first embodiment, is slidably attached to the leg cuff LC in any suitable manner. For example, a pocket 124 may be provided on the leg cuff to slidably retain the trigger member T. As illustrated in FIG. 9, each leg cuff LC1 and LC2 are provided with a trigger member T1 and T2.

Trigger members T1 and T2 extend from the leg cuffs LC1 and LC2 to the body attachment portion BA of the hobble 101. Each trigger member T1 and T2 may include a clasp member CL1 and CL2 provided at the respective ends of the trigger members T1 and T2 in order to retain the trigger members along the first connecting ring member R1. By this construction, trigger members T1 and T2 can be grasped relatively safely from the front of the animal thereby reducing the risk of being kicked or otherwise injured by the animal when attempting to activate the quick-release mechanism.

Figure 12:
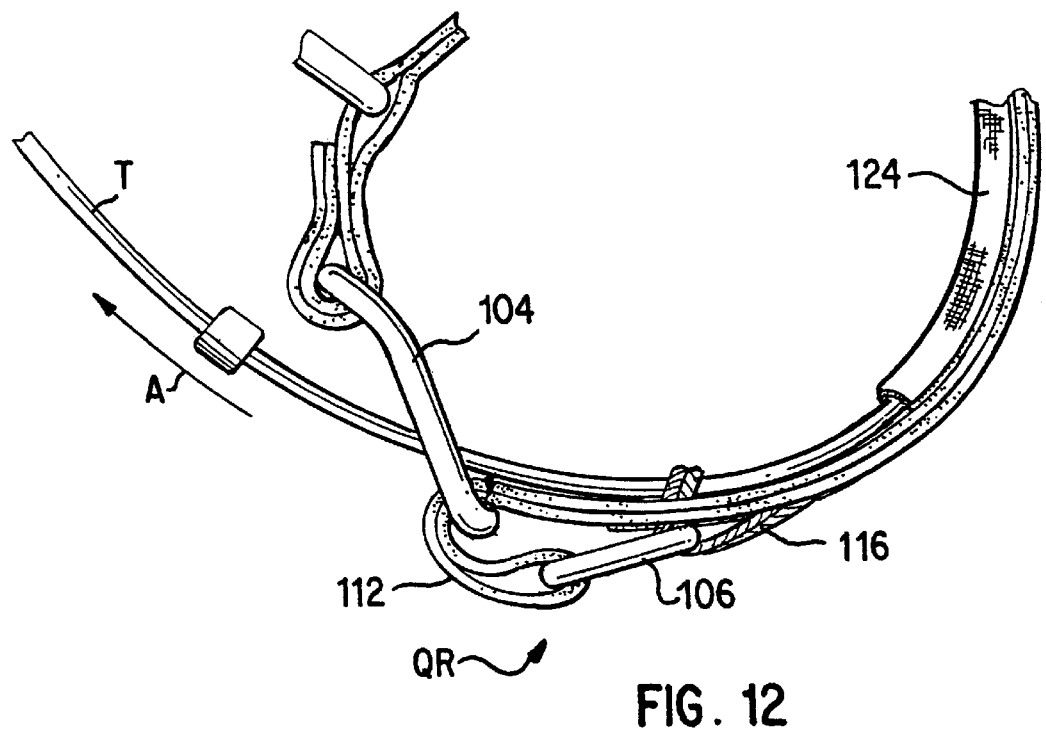
FIG. 12 is a partial top view of a leg cuff of FIG. 9 shown just prior to activation.
Figure 13:
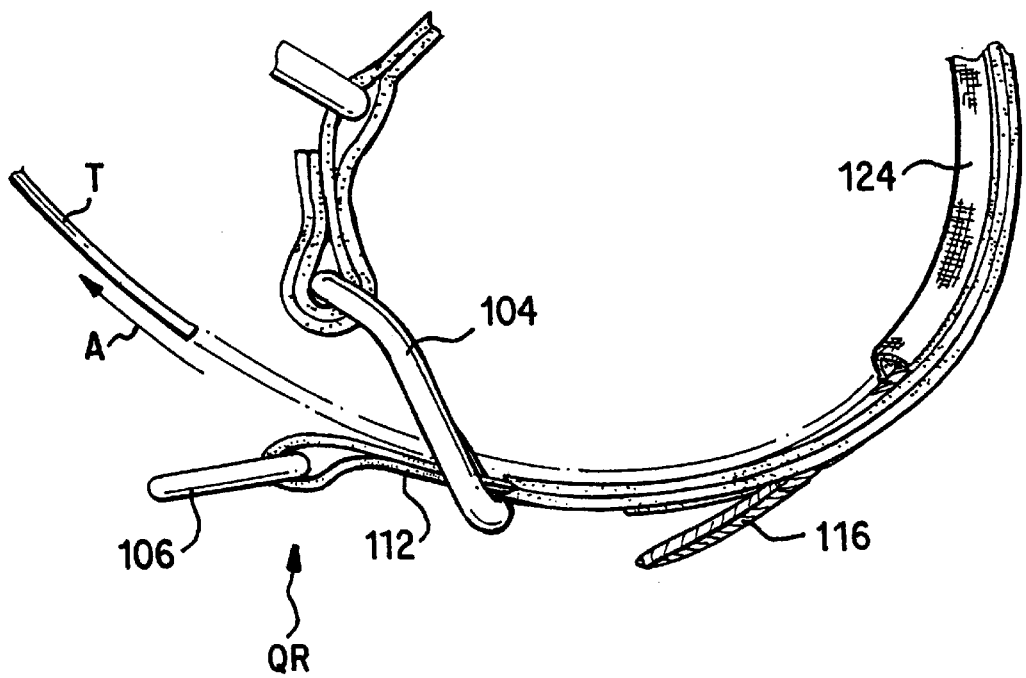
FIG. 13 is a partial top view of a leg cuff of FIG. 9 shown in a partially activated condition.
Figure 14:
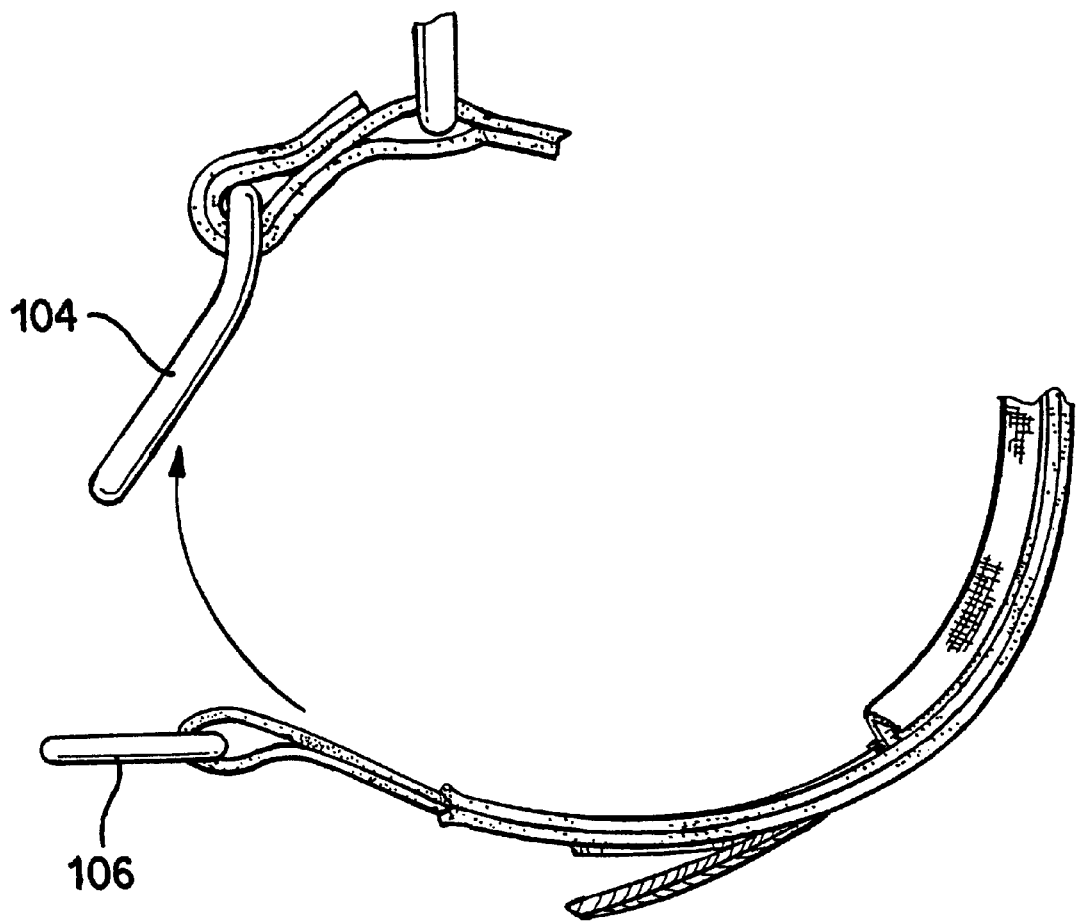
FIG. 14 is a partial top view of a leg cuff of FIG. 9 shown in a fully activated condition.

Activation of the quick-release mechanism QR will now be described by reference to drawing FIGS. 12–14.

The first relatively large ring 104 and the second relatively small ring 106 are sized relatively to each other so that the small ring 106 can freely pass through the opening in the large ring 104.

The trigger member T is pulled in the direction of arrow A and is slid out of pocket 124 and through the opening 122 disposed in a free end of the release member 116. This frees the release member 116 which is then pulled through the opening 118 in the leg cuff LC by tension applied to the first and second end cuff portions 103 and 103'. The second ring 106 and its associated connector 112 are then freed and are pulled through the opening in the large ring 104. Once the second ring 106 and its connector 112 have been completed pulled through the opening in the first ring 104, the quick-release mechanism QR is in its fully activated state and the releasable connection formed between the first and second end cuff portions 103 and 103' is broken as illustrated in FIG. 14. By constructing the quick-release mechanism QR in this manner the potential adverse effects of corrosion and contamination associated with quick-release mechanisms that include spring biased actuation members, pivoting members and camming action members are thereby avoided.

A third embodiment of the present invention will now be described by reference to drawing FIGS. 15–22.

Figure 15:
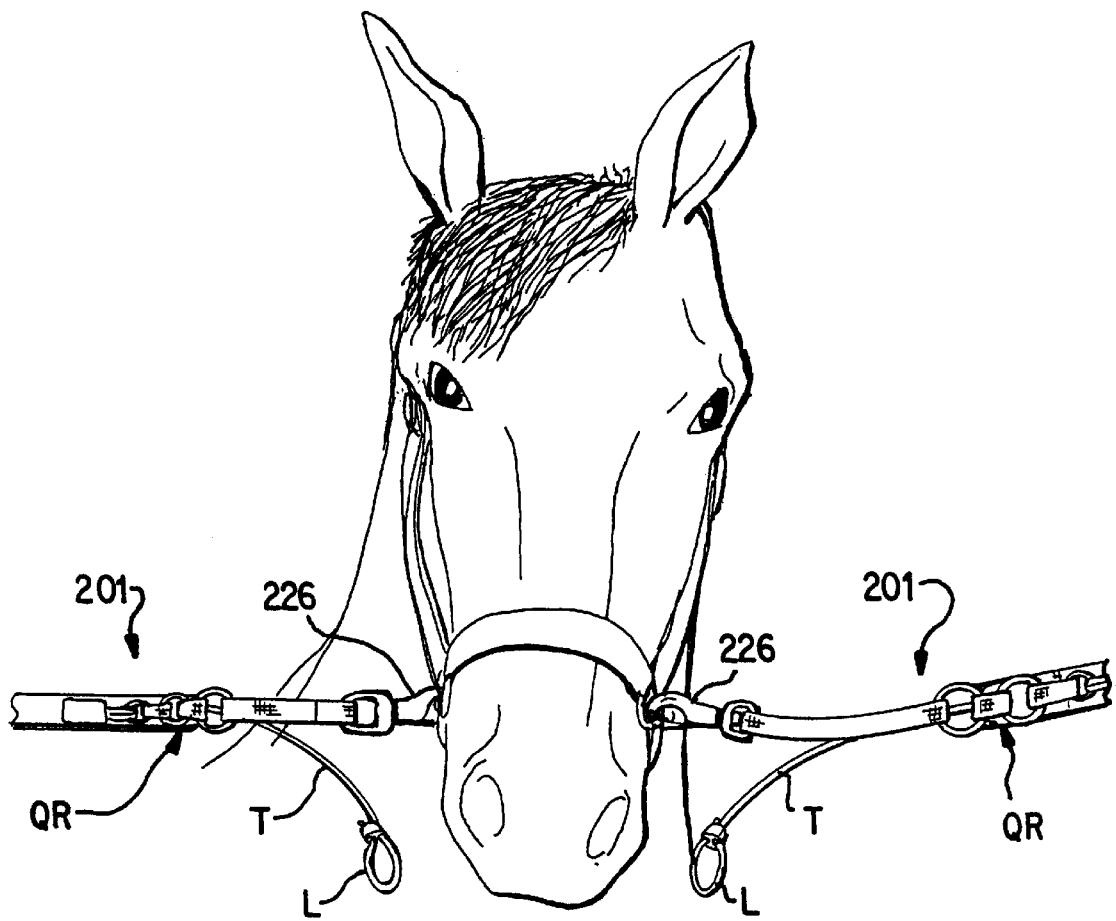
FIG. 15 is an illustration of a cross-tie arrangement constructed in accordance with the principals of the present invention.

In this third embodiment a cross-tie arrangement incorporating the quick-release mechanism constructed according to the principles of the present invention is provided. As illustrated in FIG. 15, at least one cross-tie member 201 is constructed so as to incorporate a quick-release mechanism QR embodying the principles of the present invention. Each quick-release mechanism QR includes a trigger member T. In the arrangement illustrated in FIG. 15, a plurality of cross-tie members 201 are illustrated, each are provided with a releasable clasp member 226 as is common to the art. Each trigger member T is constructed so as to extend from the quick-release member QR to a point which is adjacent to the head of the animal and is easily grasped by the handler when activating the quick-release member QR. The end of the trigger member may be provided with a construction suitable for grasping such a looped end L.

Figure 16:
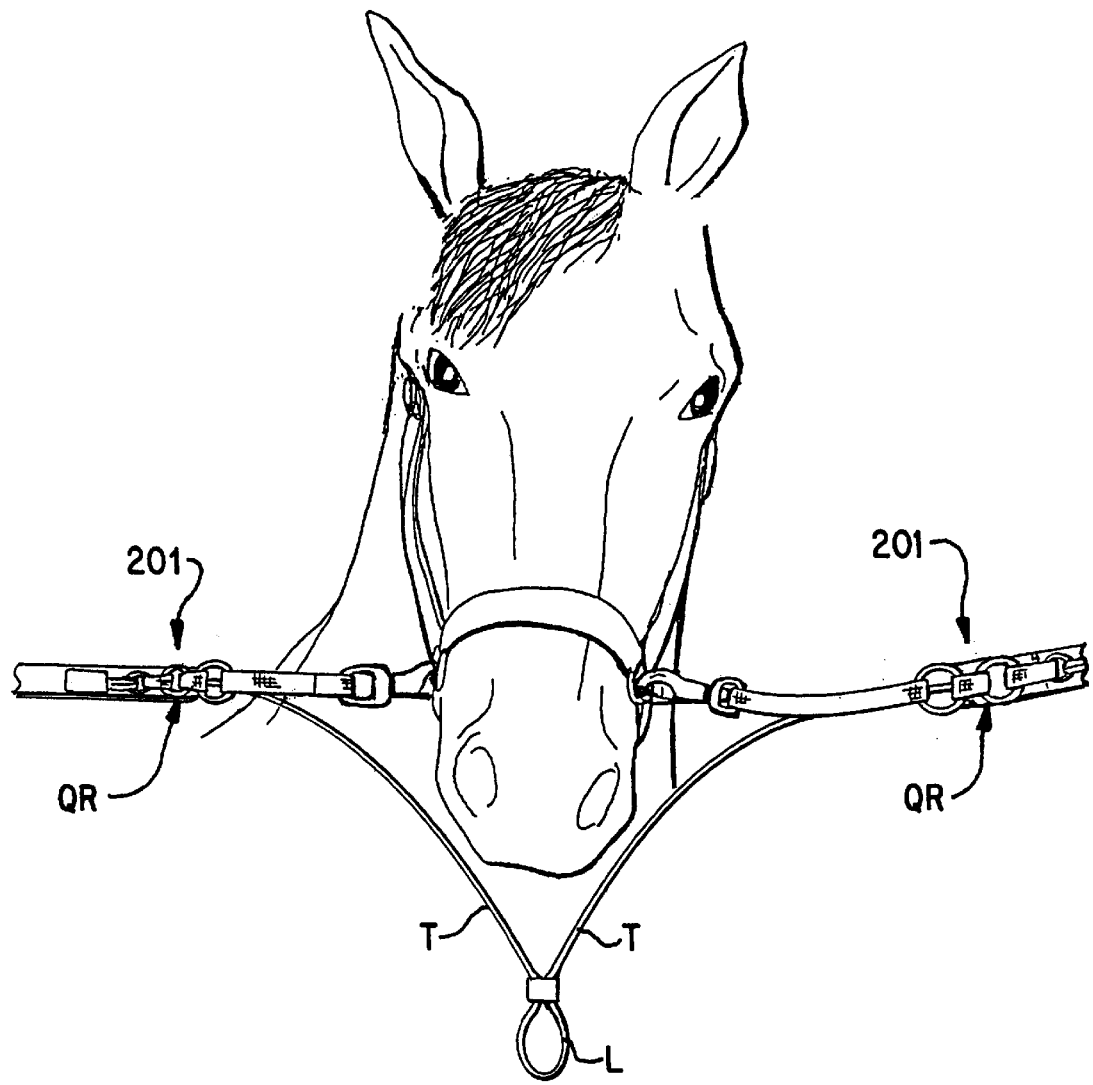
FIG. 16 is an alternative embodiment of the cross-tie arrangement of FIG. 15.

In the modified arrangement illustrated in FIG. 16, a trigger member T of each of a plurality of cross-tie members 201 are interconnected so as to form a common grasping portion of any suitable construction. In the illustrated example, the singular common grasping portion is formed as a looped end L. By this construction the handler can release the plurality of cross-ties simply by grasping the single looped end L and activating each quick-release mechanism of the plurality of cross-tie member 201.

Figure 18:
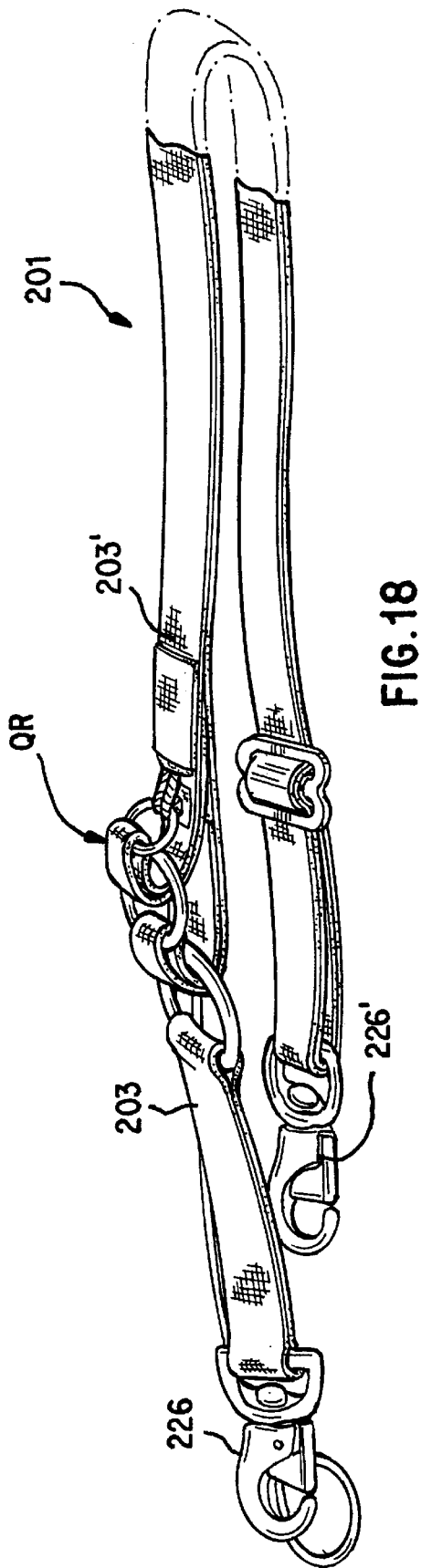
FIG. 18 is a perspective view of a complete cross-tie of FIGS. 15 and 16.

A full cross-tie member 201 constructed according to the principles of the present invention is illustrated in FIG. 18. The cross-tie member 201 generally includes a first and second releasable clasp 226 and 226' disposed at opposite ends of the cross-tie member 201. A first end cross-tie portion 203 and a second end cross-tie portion 203' are releaseably connected by a quick-release mechanism QR.

Figure 17:
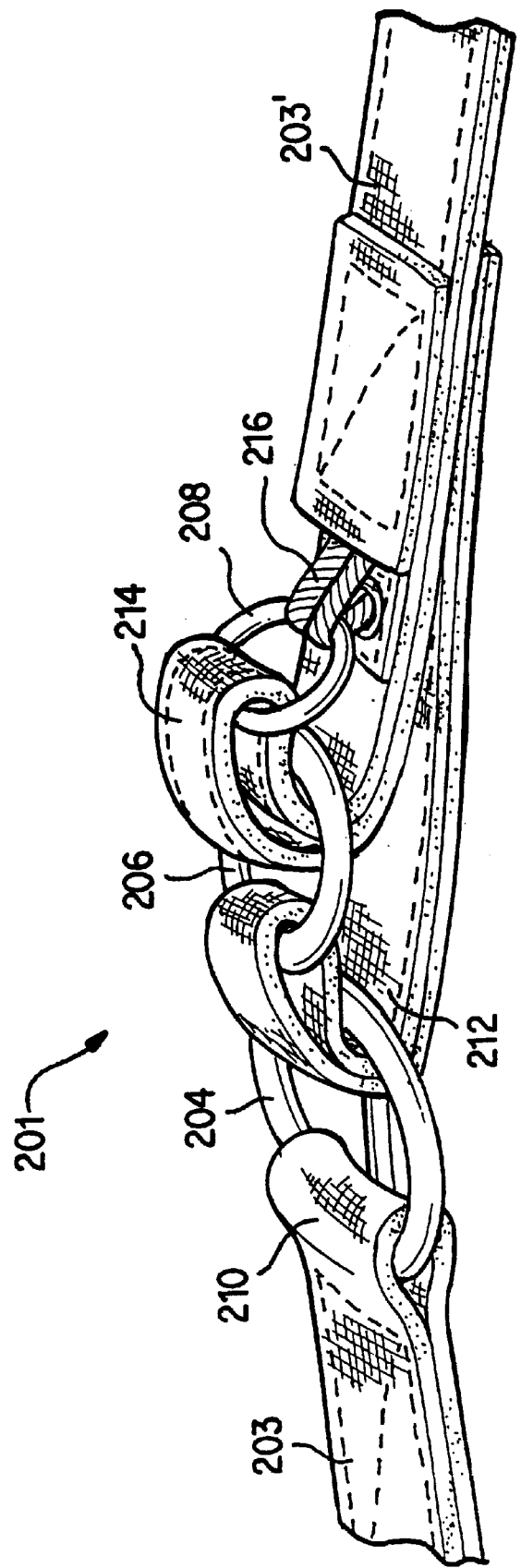
FIG. 17 is a partial perspective view of the quick-release mechanism of the cross-tie arrangement of FIGS. 15 and 16.
Figure 19:
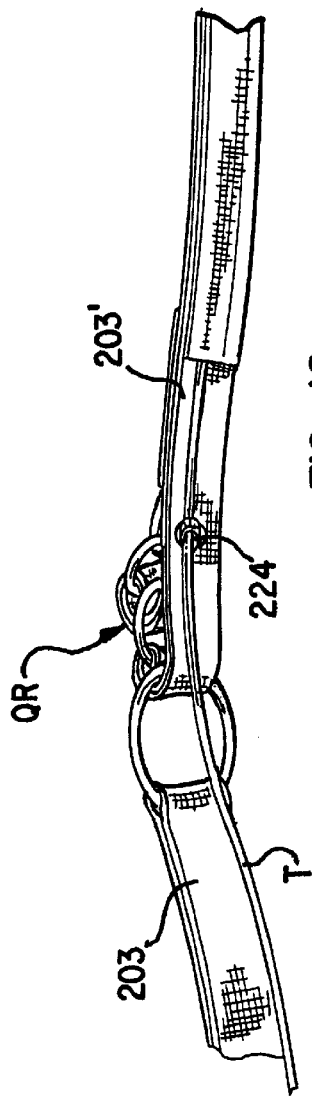
FIG. 19 is a partial bottom perspective view of a cross-tie of FIGS. 15 and 16.

The quick release mechanism QR of this embodiment is best illustrated in FIGS. 17–19.

The cross-tie 201, which may be constructed in any suitable fashion from any acceptable material, has a first and second end cross-tie portions 203, 203' which are connected in a releasable manner by the quick-release mechanism QR. The first and second end cross-tie portions 203 and 203' may be looped or have loop shaped members attached thereto. The quick-release mechanism QR includes a first large ring 204 attached to the first end cross-tie portion 203 by a first connector 10. A second mid-size ring 206 is attached to the second end rope portion 203' by a second connector 212. And a third small ring 208 is connected to the second end rope portion 203' by a third connector 214. A release member 216 is also attached to the second rope portion to 203'.

The first large ring 204 and the second mid-size ring 206 are sized relative to each other such that the second mid-size ring 206 can pass freely through the opening in the first large ring 204. The second mid-size ring 206 and the third small ring 208 are sized relative to each other such that the third small ring 208 can pass freely through the opening in the second mid-size ring 206.

In a connected state the second connector 212 is looped through the first large ring 204. The third connector 214 is looped through the second mid-size ring 206 and the release member 216 has a free end which is looped through the third small ring 208 and passes through an opening 218 in the second connector and an opening 220 in the third connector 214.

The trigger member T passes through an opening 222 in the free end of the release member 216 and is slidably attached to the cross-tie 201 in any suitable manner. By way of example, a pocket 224 may be provided either within the cross-tie member or attached to an outer surface thereof to slidably receive the trigger T. As illustrated, for example, in FIGS. 15 and 16 the trigger member T is provided with an end portion suitable for grasping. This end may take any suitable form such as a loop L.

Activation of the quick-release mechanism QR will now be more fully described by reference to FIGS. 20–22.

Trigger member T is pulled in the direction of arrow A and slid out of pocket 224 and through the opening 222 in the free end of the release member 216. As illustrated in FIG. 21, once the trigger member T has been fully removed from the pocket 224 and is completely withdrawn through the opening 222 in the release member 216, the release member 216 pulled through opening 218 in the second connector 212 and the opening 220 and the third connector 214 by tension applied to the first and second end rope portions 203 and 203'. The third small ring 208 is now freed and passes through the opening in the second mid-size ring 206. Once the small ring 208 has been pulled through the opening in the second mid-size ring 206, the second mid-size ring 206 is now freed and is pulled through the opening in the first large ring 204. Once the second mid-size ring 6 has been pulled through the opening in the first large ring 4, the quick-release QR is fully activated and the releasable connection formed between the first and second end rope portions 203 and 203' is now broken. As previously noted, the quick-release mechanism QR is constructed without the use of any bias member, pivoting member or camming action member, thereby providing increased resistance to corrosion and contamination which can adversely affect the reliability and operation of the quick-release.

Trigger member T can be of any suitable construction. For example, trigger member T can be constructed of a hollow plastic tube.

Only preferred embodiments are specifically illustrated and described herein. It should be appreciated that numerous modifications and variations of the present invention are possible in light of the disclosure, such modifications and variations being encompassed within the scope of the appended claims without departing from the spirit and scope of the present invention.

What is claimed is:

1. A rodeo rider's rope comprising:
   a first end rope portion and a second end rope portion;
   said first and second end rope portions connected in a releasable manner by a quick release mechanism;
   said quick release mechanism is essentially free of any biasing member, pivoting member, or camming action member; and
   a trigger member operably slidable relative to, and extending away from, the release mechanism, thereby enabling remote activation of the release mechanism.

2. The rope of claim 1, wherein said first and second end rope portions are looped.

3. The rope of claim 1, wherein said quick-release mechanism is a three-ring type release.

4. The rope of claim 1, further comprising a length sufficient to extend around the body of a rodeo animal.

5. A rodeo rider's rope comprising:
   a first end rope portion and a second end rope portion;
   said first and second end rope portions connected in a releasable manner by a quick release mechanism; and
   said quick release mechanism is essentially free of any biasing member, pivoting member, or camming action member wherein the quick release mechanism comprises
   a first large ring connected to said first end rope portion by a first connector;
   a second mid-size ring connected to said second end rope portion by a second connector;
   a third small ring connected to said second end rope portion by a third connector;
   said second connector looping through said first large ring when said quick-release mechanism is in a connected state, and said third connector looping through said second mid-size ring when said quick-release mechanism is in a connected state; and
   a release member attached at one end to said second end rope portion, another free end of said release member looping through said third ring and through a pair of aligned openings disposed in said second and third connectors when said quick-release is in a connected state.

6. The rope of claim 5, wherein said first large ring and said second mid-size ring are sized relative to each other such that said second ring can pass freely through said first ring, and said second mid-size ring and said third small ring are sized relative to each other such that said third ring can pass freely through said second ring.

7. The rope of claim 6, wherein a trigger member passes through an opening in the free end of said release member, thereby preventing said release member from passing back through the opening in said second and third connectors when said quick-release mechanism is in a connected state.

8. The rope of claim 7, wherein said trigger member is slidably held in a pocket which is attached to said rope, such that when said trigger member is removed by passing back through the opening in the free end of said release member, the free end of said release member falls out of said third ring, said third connector and said third ring falls out of said second ring, and said second connector and said second ring fall out of said first ring, thereby breaking the releasable connection between said first and second end rope portions.

9. The rope of claim 8, wherein said trigger member comprises a small plastic tube having a looped end to facilitate grasping or to facilitate attachment of the trigger member.

10. A method of releasing a rodeo rider's rope disposed around the body of an animal, said rope comprising a first end rope portion and a second end rope portion, said first and second end rope portions connected in a releasable manner by a quick release mechanism, said quick release mechanism is essentially free of any biasing member, pivoting member, or camming action member, the method comprising the steps of:

slidably attaching a trigger member to said rope; and attaching an end of said trigger member to the rider in a manner such that when the rider is thrown or otherwise dismounts from the animal, said quick-release mechanism is activated and the connection between said first and second end rope portions is released.

11. The method of claim 10, comprising releasably attaching the first and second end rope portions via a three-ring type quick-release mechanism.

\* \* \* \* \*